United States Patent
Nagayama et al.

(10) Patent No.: US 7,027,730 B2
(45) Date of Patent: Apr. 11, 2006

(54) METHOD FOR MEASURING TRANSMISSION LOSS IN OPTICAL TRANSMISSION LINE FOR TEST, AND SLAVE STATION, MASTER STATION, AND OPTICAL COMMUNICATION SYSTEM USING THE METHOD

(75) Inventors: Akira Nagayama, Sapporo (JP); Kazuyoshi Shimizu, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/289,305

(22) Filed: Nov. 7, 2002

(65) Prior Publication Data

US 2003/0053165 A1  Mar. 20, 2003

Related U.S. Application Data

(63) Continuation of application No. PCT/JP00/04341, filed on Jun. 30, 2000.

(51) Int. Cl.
*H04B 10/08* (2006.01)
*H04B 17/00* (2006.01)

(52) U.S. Cl. .......................................... 398/37; 398/38

(58) Field of Classification Search ................ 398/25, 398/28, 38, 62, 64, 37
See application file for complete search history.

(56) References Cited

U.S. PATENT DOCUMENTS

| | | | | |
|---|---|---|---|---|
| 4,673,291 A | * | 6/1987 | Heckmann | 356/73.1 |
| 4,829,596 A | * | 5/1989 | Barina | 398/29 |
| 5,771,111 A | * | 6/1998 | Domon et al. | 398/76 |
| 5,861,966 A | * | 1/1999 | Ortel | 398/67 |
| 5,974,237 A | * | 10/1999 | Shurmer et al. | 709/224 |
| 6,701,086 B1 | * | 3/2004 | Heiles | 398/30 |

FOREIGN PATENT DOCUMENTS

| | | |
|---|---|---|
| JP | 58-140624 | 8/1983 |
| JP | 8-304230 | 11/1996 |
| JP | 10-227722 | 8/1998 |

OTHER PUBLICATIONS

"Computer Networks" by A. Tanenbaum, Prentice-Hall, 1981, pp. 115-116.*

* cited by examiner

*Primary Examiner*—Jason Chan
*Assistant Examiner*—Shi K. Li
(74) *Attorney, Agent, or Firm*—Staas & Halsey LLP

(57) ABSTRACT

The invention provides a method for measuring transmission loss in an optical transmission line between a master station and a slave station, and also a slave station, a master station and a star network communication system using this method. Power of an optical signal is measured at a second end of an optical transmission line connected with an added slave station and at a first end other than the second end. The result at the first end is stored in a storing unit or transmitted to an incorporating unit by a transferring unit. The incorporating unit incorporates the result into a downstream optical signal, which is transmitted to the slave station. In the slave station an information extracting unit extracts the result from the downstream optical signal, and a processing unit calculates a difference between the measurement results of the first and second ends to obtain transmission loss therebetween.

21 Claims, 12 Drawing Sheets

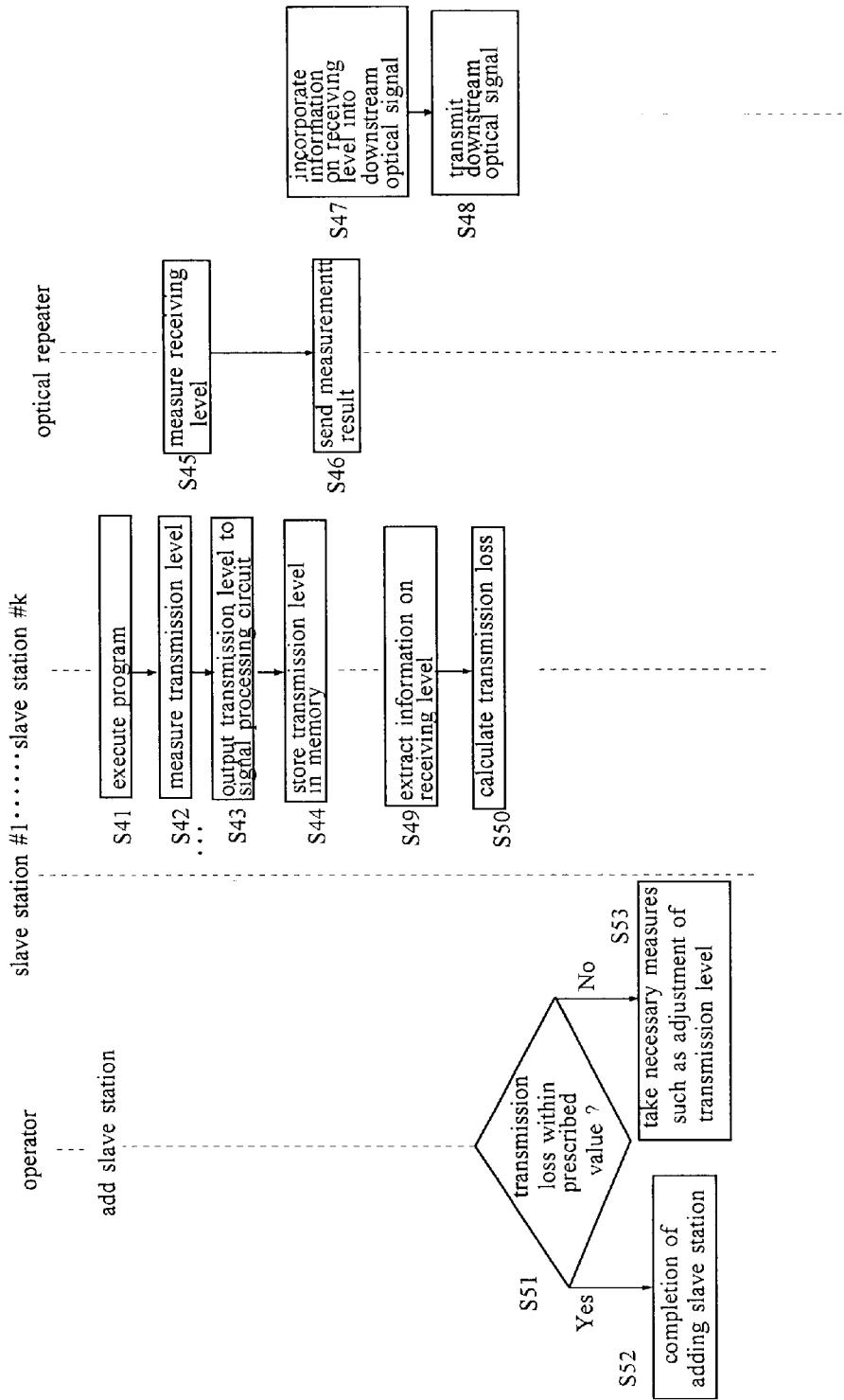

METHOD FOR MEASURING TRANSMISSION LOSS IN OPTICAL TRANSMISSION LINE FOR TEST, AND SLAVE STATION, MASTER STATION, AND OPTICAL COMMUNICATION SYSTEM USING THE METHOD

CROSS REFERENCE TO RELATED APPLICATION

This application is a continuation application of International Application PCT/JP00/04341, filed Jun. 30, 2000, and designating the U.S.

BACKGROUND OF THE INVENTION

1. Field of the Invention

The present invention relates to an optical communication system and, more particularly, to a method for measuring a transmission loss in an optical transmission line between a master station and a slave station for a test when an additional slave station is installed to a star network, and also relates to a slave station, a master station, and an optical communication system using this method.

2. Description of the Related Art

Currently, with the objective of constructing a future multimedia network, there has been a demand for an optical communication system of a large capacity over an ultra long distance. One example of this optical communication system is a star network communication system. The star network communication system comprises a master station, a plurality of slave stations, a star type coupler, and optical transmission lines. An optical signal which is generated in the master station is made incident on the star type coupler via the optical transmission line, and is branched into a plurality of optical signals in this star type coupler. The branched optical signals are transmitted to the respective slave stations via the optical transmission lines. Meanwhile, optical signals generated in the respective slave stations are transmitted to the master station in the reverse way. Thus, information is transmitted/received between one master station and n slave stations.

When an additional slave station is installed to the optical communication system of the star type, optical transmission loss and the like in the optical transmission line between the additional slave station and the master station are measured for a test in order to guarantee transmission quality.

Conventionally, in this test, an operator first measures optical power of an optical signal (downstream optical signal) which is transmitted from the master station, at a connector to which the additional slave station is connected. Next, the operator judges whether or not the measured value is within a range of preset values of a receiving level, which is defined by this optical communication system. Then, the operator determines that there is no problem in transmitting the optical signal when the value is within the range.

Another method is disclosed in Japanese Unexamined Patent Application Publication No. Hei 07-333103, in which a test device emits light on an optical transmission line, receives its backscattering light and reflected light from the optical transmission line, and analyzes data of the received light, thereby measuring the loss.

According to the former measuring test method, if the optical power of the downstream optical signal at the slave station is within the range of the preset values of the receiving level, it is judged as transmittable even though the transmission loss in the optical transmission line in a transmission section exceeds the preset value thereof, and therefore, the communication operation (service) starts between the master station and the additional slave station.

On the other hand, when the slave station transmits to the master station an optical signal (upstream optical signal) with optical power which is within a range of preset values of a transmission level, the master station receives the optical signal with a level lower than the preset value due to a transmission loss in the optical transmission line exceeding the preset value thereof, which may cause the master station to be unable to receive the upstream optical signal. It sometimes occurs that the optical signal is transmittable from the master station to the slave station but not from the slave station to the master station because the ranges of the preset values of the transmission level and the receiving level are often different between in the master station and in the slave station depending on settings of manufacturers.

According to the latter method, the test device is complex and expensive. The test device needs to be complex because it has to analyze data of received backscattering light and reflected light, and emitted light, and because an optical signal have to be demultiplexed at both of a receiving station and a test device installed station.

SUMMARY OF THE INVENTION

It is an object of the present invention, therefore, to provide a method which is different from the conventional methods, in which transmission loss in the optical transmission line can be reliably determined and in which the optical transmission line can be tested with a simple device, as well as to provide a slave station, a master station and an optical communication system using this method.

The above-described disadvantages occur mainly because optical power received at the slave station, instead of transmission loss in the optical transmission line, is indirectly evaluated. Hence, in order to achieve the above object, the invention provides the following optical communication system. The optical communication system has a master station and a plurality of slave stations connected in a star network via an optical repeater and optical transmission lines. In a test subject optical transmission line power of an optical signal is measured at a second end with which an added slave station is connected and at a first end which is the other end, by a second measuring unit and a first measuring unit respectively, and the measurement result at the first end is stored in a storing unit. Alternatively, a transferring unit sends the measurement result at the first end to an incorporating unit. The incorporating unit incorporates the measurement result at the first end into a downstream optical signal, which is transmitted from the master station to the slave station, and transmits the downstream optical signal to the slave station. Then, in this optical communication system, an information extracting unit extracts the measurement result at the first end from the downstream optical signal at the slave station, and a processing unit obtains a difference between the measurement result at the first end and the measurement result at the second end, thereby calculating the optical transmission loss in the optical transmission line between the first end and the second end.

According to this invention, the slave station accumulates values of the power of the optical signals measured at both ends of the optical transmission line, and obtains a transmission loss in the optical transmission line directly from the accumulated values. Hence, bi-directional communication between the master station and the added slave station can be realized without fail. Moreover, according to such an invention, the optical transmission line can be tested with the above-described simple configuration.

According to the present invention, since values of the power of the optical signals which are necessary for obtaining transmission loss in the optical transmission line are accumulated in the slave station, an operator placed at the slave station alone can install an additional slave station, which eliminates the necessity of placing another operator at the master station.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 13 is a flowchart showing a procedure of an optical transmission loss test according to the fourth embodiment.

DESCRIPTION OF THE PREFERRED EMBODIMENTS

Hereinafter, preferred embodiments of the present invention will be explained based on the drawings. Incidentally, the same numerals and symbols are given to designate the same structures in the respective drawings, and explanations thereof will be omitted.

First Embodiment

In a first embodiment a slave station, an optical communication system and a method for measuring a transmission loss in an optical transmission line according to the present invention are realized.

Figure 1:
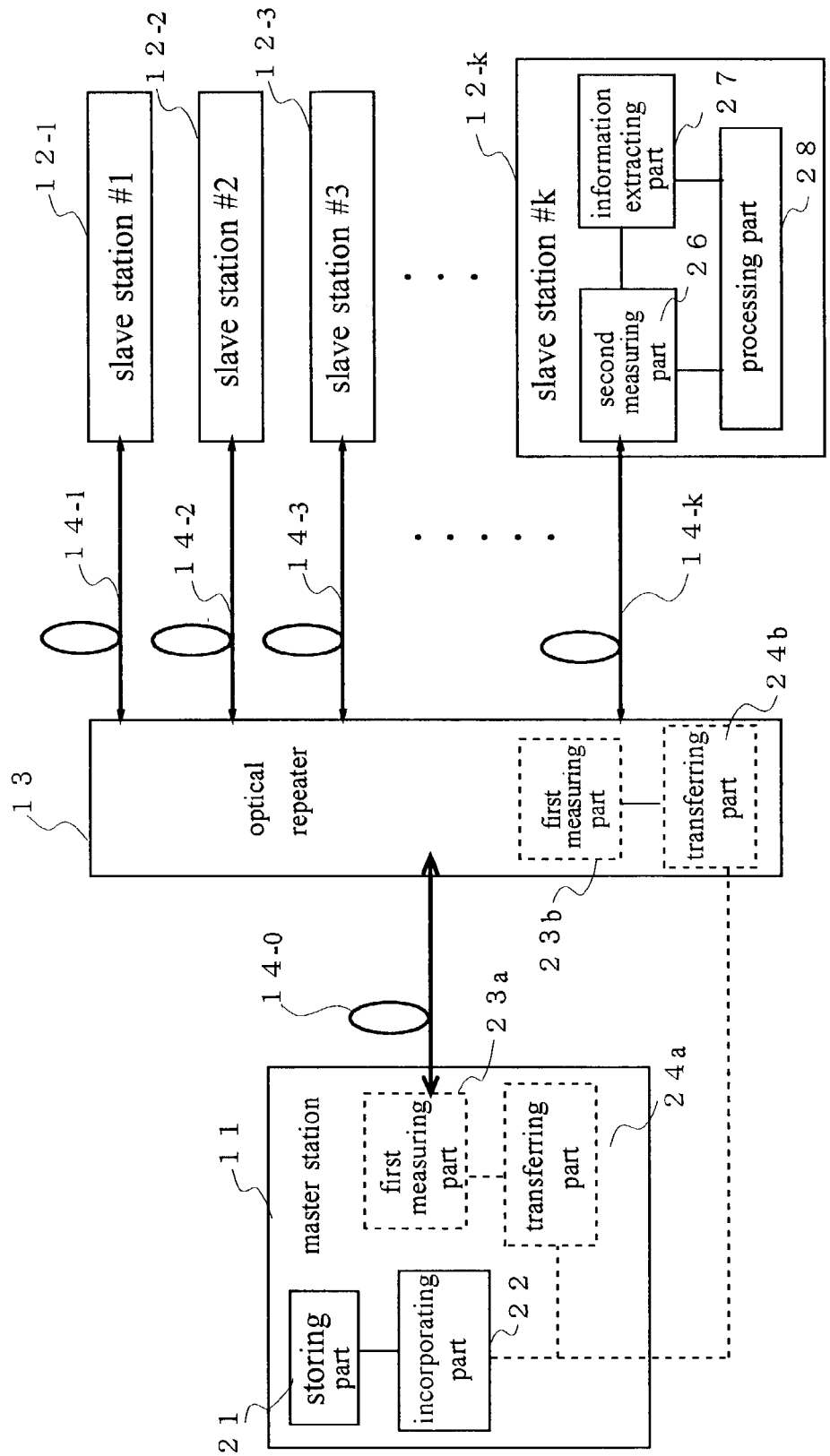
FIG. 1 is a view showing the structure of an optical communication system according to a first embodiment.

FIG. 1 is a view showing the structure of the optical communication system according to the first embodiment.

As shown in FIG. 1, in the optical communication system, a master station 11 and a plurality of slave stations 12-1 to 12-$k$ are connected in a star network via an optical repeater 13 and optical transmission lines 14. A downstream optical signal transmitted from the master station 11 is inputted to the optical repeater 13 via an optical transmission line 14-0. The optical repeater 13 branches this downstream optical signal into at least a number of downstream optical signals corresponding to the number of slave stations 12-1 to 12-$k$. The branched downstream optical signals are inputted to the slave stations 12-1 to 12-$k$ via optical transmission lines 14-1 to 14-$k$, respectively. Meanwhile, upstream optical signals which are transmitted from the slave stations 12-1 to 12-$k$ to the master station 11 are transmitted through the route reverse to the above-described route respectively.

The case of measuring optical transmission loss in the optical transmission lines 14 between the master station 11 and a predetermined slave station 12-$k$, for example, in such an optical communication system, will be explained below.

A storing part 21 is provided in the master station 11 and stores information concerning power of an optical signal at a predetermined point in the optical transmission lines 14 except for its end to which the predetermined slave station 12-$k$ is connected.

An incorporating part 22 is provided in the master station 11 and incorporates the stored information into the downstream optical signal to be transmitted to the predetermined slave station 12-$k$.

A second measuring part 26 is provided in the predetermined slave station 12-$k$ and measures power of an optical signal at the end of the optical transmission line 14 to which the predetermined slave station 12-$k$ is connected. The measurement result is outputted to a processing part 28.

An information extracting part 27 is provided in the predetermined slave station 12-$k$ and extracts the information incorporated therein in the incorporating part 22, from the downstream optical signal. The extracted information is outputted to the processing part 28.

The processing part 28 is provided in the predetermined slave station 12-$k$ and obtains a difference between the output of the second measuring part 26 and the output of the information extracting part 27 to output an optical transmission loss in the optical transmission line.

Namely, the predetermined slave station 12-$k$ used in this optical communication system includes the second measuring part 26 which measures the power of the optical signal at an end of a test subject optical transmission line 14 to which the predetermined slave station 12-$k$ is connected, the information extracting part 27 for extracting from the downstream optical signal the information about the power of the optical signal which is measured at the predetermined point in the test subject optical transmission line 14, except for the end of the test subject optical transmission line 14 to which the predetermined slave station 12-$k$ is connected, that is, the information about the power of the optical signal which is incorporated in the master station 11 into the downstream optical signal to be transmitted to the predetermined slave station 12-$k$, and the processing part 28 which obtains the difference between the output of the second measuring part 26 and the output of the information extracting part 27 and outputs the optical transmission loss in the test subject optical transmission line 14. The test subject optical transmission line 14 is connected with the predetermined slave station 12-$k$ and an optical transmission line in which a transmission loss is measured for testing.

In the optical communication system and the predetermined slave station 12-$k$ as described above, it is possible to directly measure the optical transmission loss in the optical transmission line between the predetermined slave station 12-$k$ and the predetermined point. When the predetermined slave station 12-$k$ is the one to be added, the added slave station is capable of obtaining the optical transmission loss in the optical transmission line to be connected thereto, which realizes secure bi-directional communication between the master station and the added slave station.

It should be noted that, in this embodiment, the predetermined slave station 12-$k$ is structured of having the second measuring part 26, the information extracting part 27 and the processing part 28, however, all the slave stations 12-1 to 12-$k$ do not have to have this structure. Only the slave station 12-$k$, which is connected with the optical transmission line 14 to be tested, should include the above parts.

More Preferable Mode of First Embodiment

The optical communication system of the first embodiment may have a first measuring part 23 and a transferring part 24 in replace of the storing part 21, and the incorporating part 22 may function as described below.

The first measuring part 23 measures power of an optical signal at a predetermined point in the optical transmission line except for its end to which the predetermined slave station 12-$k$ is connected. The measurement result is outputted to the transferring part 24.

The transferring part 24 transfers information about the power of the optical signal, which is measured in the first measuring part 23, to the incorporating part 22. Namely, the information about the power of the optical signal is notified to the incorporating part 22.

In this case, the incorporating part 22 is provided in the master station 11 and incorporates the information transmitted from the transferring part 24 into the downstream optical signal to be transmitted to the slave station 12-1 to 12-$k$. The downstream optical signal is transmitted to the slave stations 12-1 to 12-$k$.

It should be noted that in FIG. 1 two measuring parts, a first measuring part 23$a$ and a first measuring part 23$b$, and two transferring parts, a transferring part 24$a$ and a transferring part 24$b$, are drawn with the broken lines for convenience of explanation, however, only one of them may be provided. In addition, placement of the first measuring part 23 and the transferring part 24 are not limited to the one shown in FIG. 1. These parts should be appropriately provided in the optical transmission line 14-$k$ to be measured between the master station 11 and the predetermined slave station 12-$k$.

In the optical communication system according to the first embodiment, it is preferable that the predetermined point is at an end of the test subject optical transmission line 14-$k$ which is connected to the master station 11, and that the optical signal whose power is measured is the downstream optical signal to be transmitted to the predetermined slave station 12-$k$.

Namely, the first measuring part 23$a$ and the transferring part 24$a$ are provided in the master station 11 as shown in FIG. 1.

In this structure, it is possible to obtain optical transmission loss in the optical transmission line 14-$k$, the optical repeater 13 and the optical transmission line 14-0. It is also possible to obtain optical transmission loss in a direction from the master station 11 toward the slave stations 12-$k$.

Moreover, in the optical communication system according to the first embodiment, it is preferable that the predetermined point is at an end of the test subject optical transmission line 14-$k$ to which the master station 11 is connected, and that an optical signal whose power is measured is the upstream optical signal to be transmitted from the predetermined slave station 12-$k$ to the master station 11.

In this structure, it is possible to obtain the optical transmission loss in the optical transmission line 14-$k$, the optical repeater 13 and the optical transmission line 14-0. Further, it is possible to obtain optical transmission loss in a direction from the predetermined slave station 12-$k$ toward the master station 11.

Furthermore, in the optical communication system according to the first embodiment, it is preferable that the predetermined point is at an end of the test subject optical transmission line 14 to which the optical repeater 13 is connected, and that an optical signal whose power is measured is the upstream optical signal to be transmitted from the predetermined slave station 12-$k$ to the master station 11.

Namely, the first measuring part 23$b$ and the transferring part 24$b$ are provided in the optical repeater 13 as shown in FIG. 1.

In this structure, it is possible to obtain the optical transmission loss in the optical transmission line 14-$k$. Further, it is possible to obtain the optical transmission loss in the direction from the predetermined slave station 12-$k$ toward the master station 11.

Next, another embodiment will be explained.

Structure of Second Embodiment

A slave station, an optical communication system and a method for measuring a transmission loss in an optical transmission line for testing according to the present invention are applied to a second embodiment.

As a summary of the second embodiment, optical power of a downstream optical signal is measured at both ends of an optical transmission line for test, and the optical power of the downstream optical signal which is measured in a master station is incorporated into the downstream optical signal, thereby measuring optical transmission loss in the test subject optical transmission line in a slave station.

Figure 2:
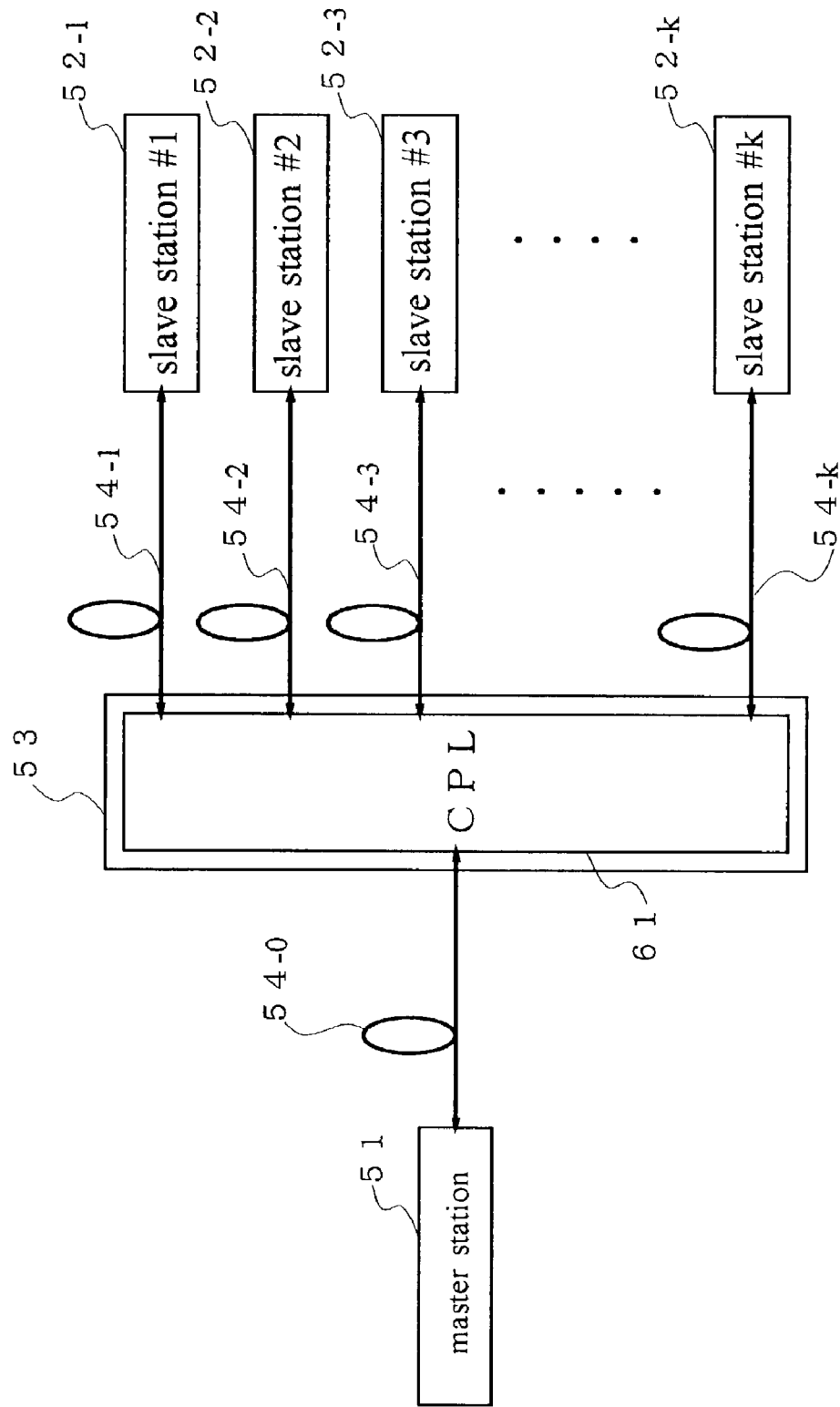
FIG. 2 is a view showing the structure of the optical communication system according to a second embodiment.

FIG. 2 is a view showing the structure of the optical communication system according to the second embodiment.

Figure 3:
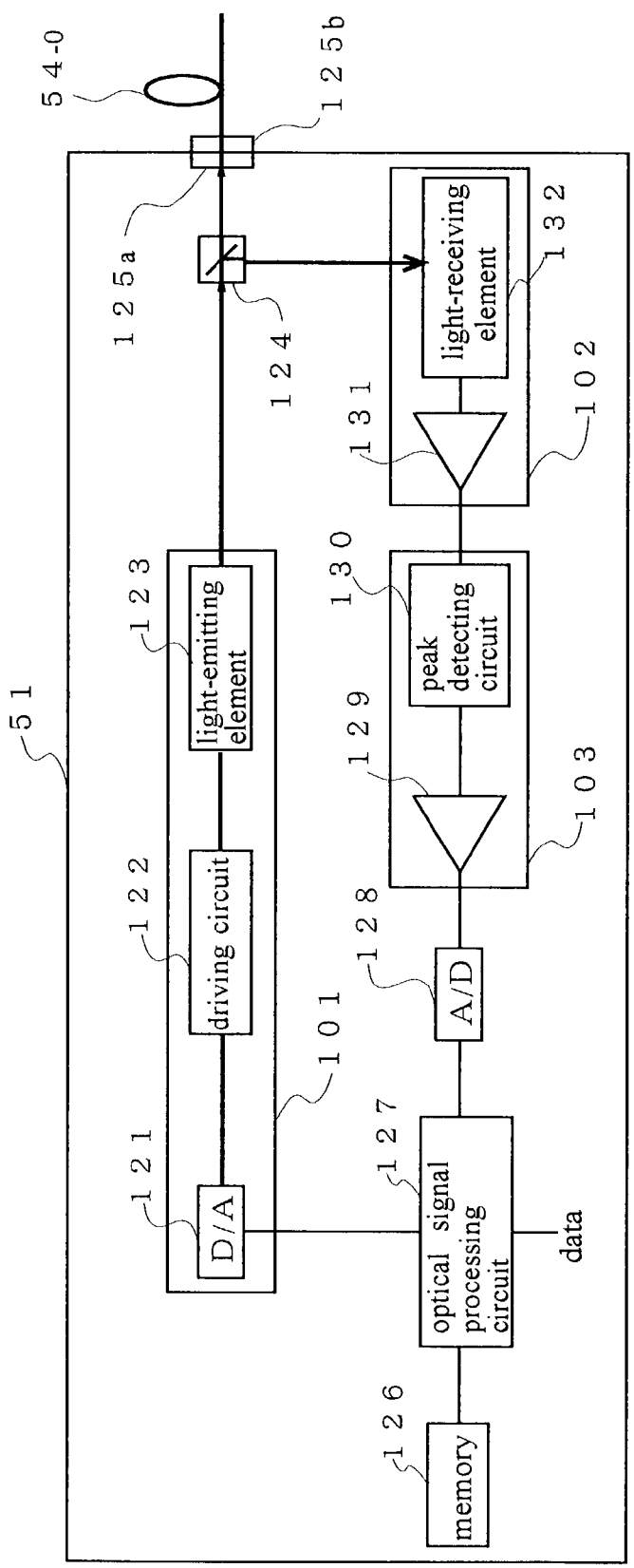
FIG. 3 is a view showing the structure of a master station of the optical communication system according to the second embodiment.

FIG. 3 is a view showing the structure of the master station of the optical communication system according to the second embodiment.

Figure 4:
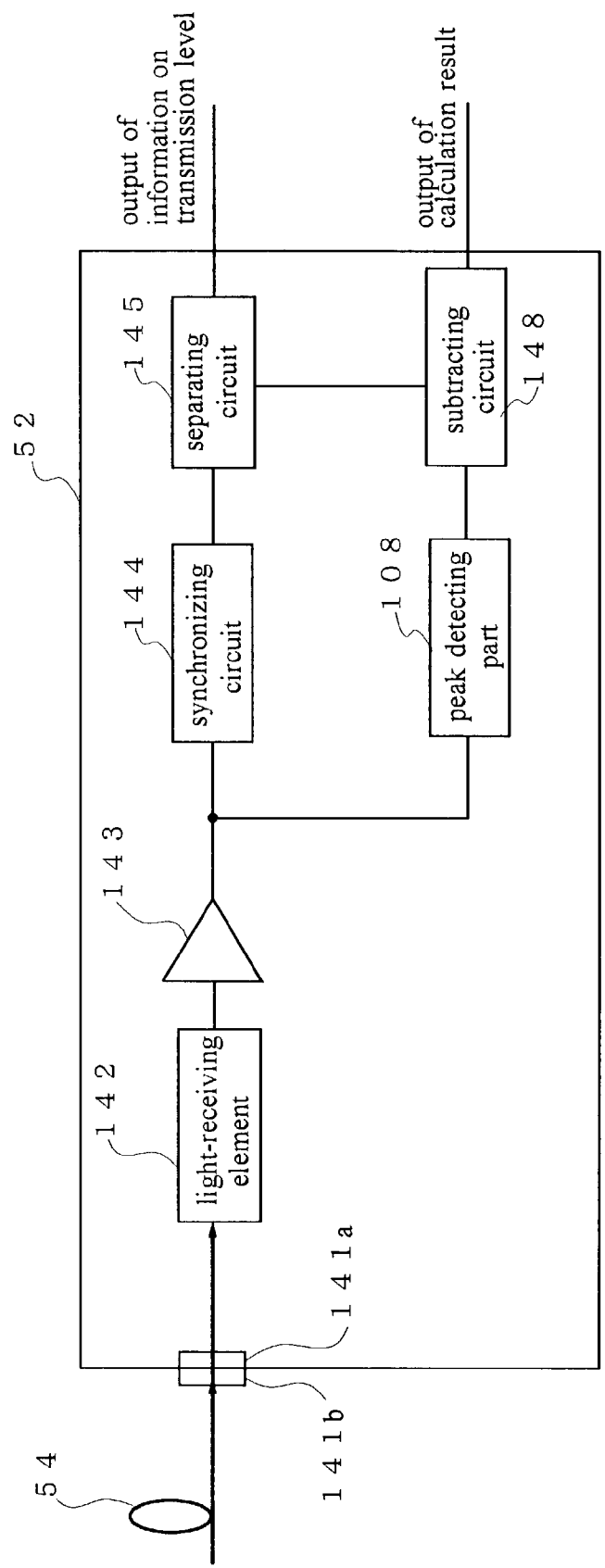
FIG. 4 is a view showing the structure of a slave station of the optical communication system according to the second embodiment.

FIG. 4 is a view showing the structure of the slave station of the optical communication system according to the second embodiment.

Figure 5:
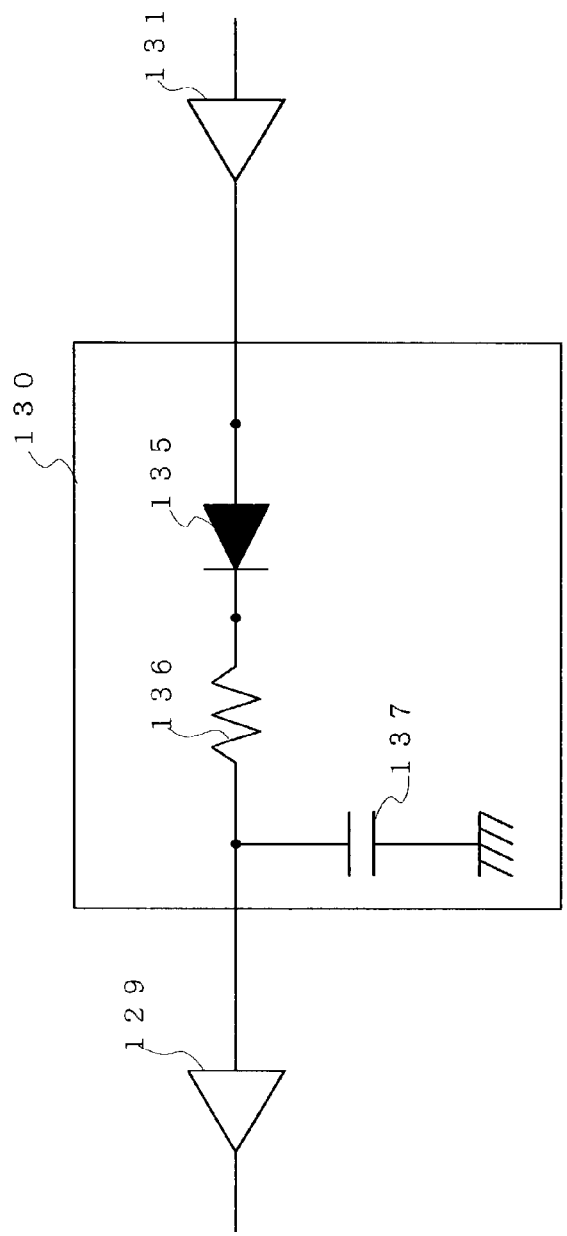
FIG. 5 is a view showing one structural example of a peak detecting circuit.

FIG. 5 is a view showing a structural example of a peak detecting circuit.

Figure 6:
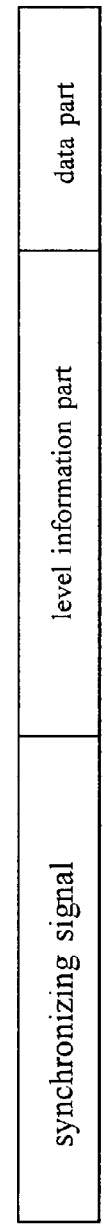
FIG. 6 is a view showing a frame format of a downstream optical signal.

FIG. 6 is a view showing a structural example of a frame format of the downstream optical signal.

As shown in FIG. 2, the optical communication system is structured of having a master station 51, a plurality of slave stations 52-1 to 52-$k$, an optical repeater 53 and optical transmission lines 54-1 to 54-$k$ which are connected in a star network.

A downstream optical signal which is generated in the master station 51 is made incident on the optical repeater 53 via an optical transmission line 54-0. The optical repeater 53 is structured of having an optical coupler (hereinafter abbreviated to "CPL") 61 of a star type, and branches this downstream optical signal into at least a number of downstream optical signals corresponding to the number of the slave stations 52-1 to 52-$k$. The branched downstream optical signals are made incident on slave stations 52-1 to 52-*k* via optical transmission lines 54-1 to 54-*k* respectively. Meanwhile, upstream optical signals which are transmitted from the slave stations 52-1 to 52-*k* to the master station 51 are transmitted through the route reverse to the above-described route.

Next, the structure of the master station 51 will be explained.

As shown in FIG. 3, the master station 51 is structured of an optical signal processing circuit 127, a digital/analog converting circuit (hereinafter abbreviated to the "D/A") 121, a driving circuit 122, a light-emitting element 123, a CPL 124, a connector 125*a, b,* a memory 126, an analog/digital converting circuit (hereinafter abbreviated to the "A/D") 128, amplifiers 129 and 131, a peak detecting circuit 130 and a light-receiving element 132.

The light-emitting element 123 includes a light-emitting diode, a semiconductor laser and so on. Part of emitted optical signal is branched in the CPL 124 and outputted to the optical transmission line 54-0 via the connector 125*a*. A part of the branched optical signal in the CPL 124 is made incident on the light-receiving element 132 which comprises a photodiode and the like. A connector 125*a* which is provided to the master station 51 and a connector 125*b* which is provided to the optical transmission line 54-0, and connect the master station 51 and the optical transmission line 54-0 optically.

The light-receiving element 132 converts the optical signal into an electrical signal, and outputs it to the amplifier 131. The amplifier 131 is a preamplifier, and amplifies this electrical signal to a predetermined level. The amplified electrical signal is inputted to the peak detecting circuit 130. A light-receiving part 102 is structured of the light-receiving element 132 and the amplifier 131.

The peak detecting circuit 130 detects a maximum value of a level of the inputted electrical signal. This peak detecting circuit 130 is structured of, for example, a diode 135, a resistor 136 and a capacitor 137, as shown in FIG. 5. An anode terminal of the diode 135 is connected to an output terminal of the amplifier 131, and a cathode terminal thereof is grounded via the resistor 136 and the capacitor 137. The peak detecting circuit 130 is output as an inter-terminal voltage of the capacitor 137.

The maximum value outputted from the peak detecting circuit 130 is inputted to the amplifier 129. The amplifier 129 is a post amplifier, and amplifies the maximum value to a predetermined level. The amplified maximum value is converted from an analog signal into a digital signal in the A/D 128, and outputted to the optical signal processing circuit 127. A peak detecting part 103 is structured of the peak detecting circuit 130 and the amplifier 129.

The optical signal processing circuit 127 is structured of a microprocessor and the like, and stores the inputted maximum value into the memory 126. Thus, the optical signal processing circuit 127 records the maximum value of a transmission level. Moreover, various data such as a program for carrying out a later-described optical transmission loss measuring test, values needed during execution of the program, a current value for driving the light-emitting element 123 is stored in the memory 126.

When generating the downstream optical signal, the optical signal processing circuit 127 accepts the maximum value from the memory 126 and accepts from a not-shown circuit data to be transmitted from the master station 51 to the slave stations 52-1 to 52-*k*, and outputs a downstream optical having the frame format shown in FIG. 6 to the driving circuit 122 via the D/A 121.

As shown in FIG. 6, the optical signal according to this embodiment comprises a synchronizing signal which is used to establish synchronization between a receiving side and a transmission side, a level information part for incorporating the information about the power of the optical signal, and a data part for incorporating data to be transmitted. According to this embodiment, the maximum value, that is, the power of the downstream optical signal in the master station 51, is incorporated to the level information part. Further, the data part consists of a plurality of slots in consistence with the number of the slave stations 52-1 to 52-*k*.

The driving circuit 122 allows the light-emitting element 123 to emit light by supplying a current to the light-emitting element 123. This supplied current is modulated by an optical signal from the optical signal processing circuit 127, thereby directly modulating the light emission of the light-emitting element 123. An optical signal generating part 101 is structured of the D/A 121, the driving circuit 122 and the light-emitting element 123.

Next, the structure of the slave station 52 will be explained.

As shown in FIG. 4, the slave station 52 is structured of a connector 141*a*, a light-receiving element 142, an amplifier 143, a synchronizing circuit 144, a separating circuit 145, a peak detecting part 108 and a subtracting circuit 148.

The downstream optical signal which is generated in the master station 51 is repeated by the optical repeater 53 and is made incident on the connector 141*a* via a connector 141*b* of the optical transmission line 54. A connector 141*a* which is provided to the slave station 52 and a connector 141*b* which is provided to the optical transmission line 54 connect the slave station 52 and the optical transmission line 54 optically.

The downstream optical signal made incident on the connector 141*a* is subjected to optical-to-electrical conversion in the light-receiving element 142, and inputted to the amplifier 143 as an electrical signal. This electrical signal is amplified to a predetermined level in the amplifier 143 which is a preamplifier. The amplified electrical signal is inputted to the synchronizing circuit 144 and the peak detecting circuit 108.

The synchronizing circuit 144 establishes synchronization with this electrical signal (downstream optical signal) based on the synchronizing signal of the electrical signal. The separating circuit 145 extracts data and information on the transmission level from the electrical signal inputted via the synchronizing circuit 144, at the same timing as the synchronizing circuit 144 establishes synchronization. Then, the separating circuit 145 outputs the data to an exterior circuit (not shown) which uses the data, and outputs the information on the transmission level to the subtracting circuit 148.

Meanwhile, the peak detecting circuit 108 detects a maximum value of a level of the inputted electrical signal, amplifies the detected value to a predetermined level, and thereafter, outputs the resultant to the subtracting circuit 148. Since the structure of the peak detecting circuit 108 is the same as that of the above-described peak detecting circuit 103 in the master station 51, its explanation is omitted.

The subtracting circuit 148 subtracts the output of the peak detecting part 108 from the output of the separating circuit 145, and outputs the calculation result as optical transmission loss in the test subject optical transmission line.

Operation and Effect of Second Embodiment

Operation and effect in the case where an additional slave station 52-k is installed in this optical communication system of star network will be explained.

Figure 7:
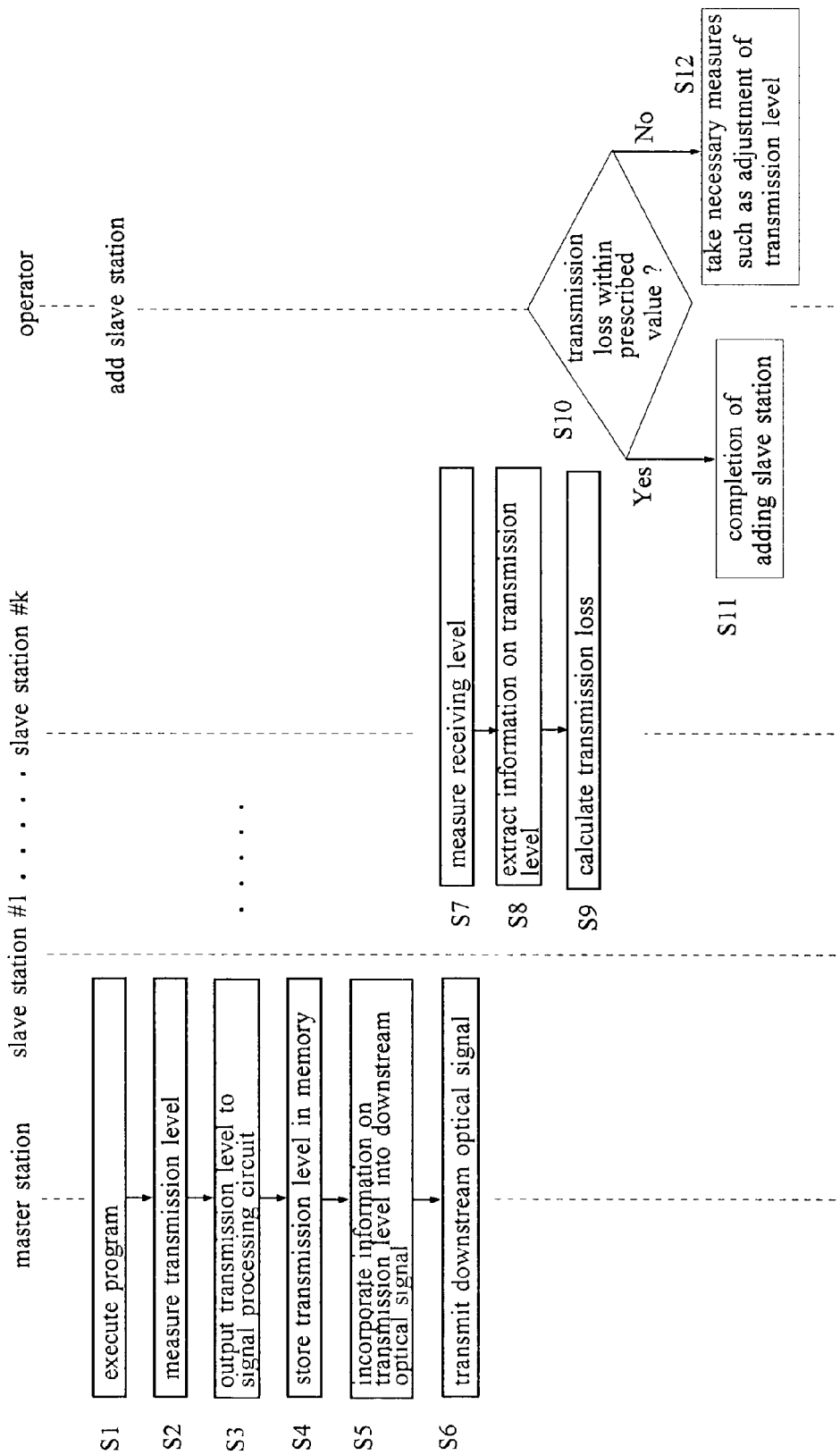
FIG. 7 is a flowchart showing a procedure of an optical transmission loss test according to the second embodiment.

FIG. 7 is a flow chart showing a procedure of the optical transmission loss measuring test according to the second embodiment.

In FIG. 7, the optical signal processing circuit 127 in the master station 51 reads and executes the optical transmission loss measuring test program which is stored in the memory 126, when, for example, the master station 51 is initially set up (S1).

The optical signal processing circuit 127 allows the light-emitting element 123 to emit light with a light-emission amount corresponding to the transmission level of the downstream optical signal, and allows the peak detecting part 103 to measure the transmission level (S2).

The peak detecting part 103 outputs the measurement result to the optical signal processing circuit 127 (S3), and the optical signal processing circuit 127 stores this information about the transmission level into the memory 126 (S4).

The optical signal processing circuit 127 accepts the information about the transmission level from the memory 126, and accepts data to be transmitted, if there exists, in the respective slave stations 52-1 to 52-k. Then, the optical signal processing circuit 127 converts the accepted information and data into an optical signal which is suitable for transmission, and allows the light-emitting element 123 to emit light accordingly, thereby generating a downstream optical signal having the information about the transmission level incorporated therein (S5).

The generated downstream optical signal is outputted to the optical transmission line 54-0. Then, this downstream optical signal is branched in the CPL 61 of the star type in the optical repeater 53 and transmitted to the respective slave stations 52-1 to 52-k, and one of the branched signals is transmitted to the slave station 52-k (S6).

The slave station 52-k receives this downstream optical signal in the light-receiving element 142, and the peak detecting part 108 in the slave station 52-k detects a maximum value of a receiving level (S7). Then, this detection result is outputted to the subtracting circuit 148.

In the slave station 52-k, the separating circuit 145 extracts the information about the transmission level of the master station 51 from the electrical signal based on the received downstream optical signal, and outputs it to the subtracting circuit 148 (S8).

Then, in the slave station 52-k, the subtracting circuit 148 subtracts the receiving level detected in the slave station 52-k from the extracted transmission level of the master station 51, whereby the optical transmission loss in the optical transmission lines 54 which is connected with the additional slave station 52-k is calculated. Namely, the optical transmission loss in the optical transmission line 54-0, the optical repeater 53, and the optical transmission line 54-k is measured (S9).

The measurement result is outputted to the exterior and, for example, displayed on a display device.

An operator determines whether the optical transmission loss is within a range of preset values of the optical transmission line, from the measurement result (S10), and when it is within the range, completes operation of adding the slave station (S11). The optical communication system starts its operation.

On the other hand, when the optical transmission loss is beyond the range of the preset values, the operator takes necessary measures such as an inspection for the optical transmission lines 54 from the master station 51 to the slave station 52-k, especially for a splice loss, and an adjustment of the transmission level of the upstream optical signal of the slave station 52-k, so as to receive the upstream optical signal which is transmitted from the slave station 52-k in the master station 51 (S12).

At the time of adding the slave station 52-k to this optical communication system, the optical transmission loss in the test subject optical transmission line to which the slave station 52-k is connected can be directly measured from the respective optical power at both ends of the test subject optical transmission line. This makes it possible to transmit the upstream optical signal generated in the added slave station 52-k to the master station without fail.

In this optical communication system, the information about the transmission level of the master station 51 is incorporated into the downstream optical signal, so that an operator at the slave station alone is able to install an additional slave station 52-k. This eliminates the necessity to place another operator in the master station 51.

It should be noted that in the second embodiment the transmission level of the downstream optical signal is measured by the light-receiving part 102, the peak detecting part 103 and the D/A 128, however, it may also be measured by connecting an optical power meter which measures light intensity to the connector 125a of the master station 51, and the measurement result may be stored in the memory 126. In such a case, the master station 51 does not need to have the light-receiving part 102, the peak detecting part 103 and the D/A 128.

Moreover, the transmission level of the downstream optical signal is temporarily stored in the memory 126 in the second embodiment; however, it may be incorporated into the downstream optical signal immediately after the measurement, without storing it in the memory 126, and then transmitted to the slave station 52-k.

Next, another embodiment will be explained.

Structure of Third Embodiment

A slave station, an optical communication system and an optical transmission loss measuring test method according to the present invention are applied to a third embodiment.

As a summary of the third embodiment, optical power of an upstream optical signal is measured at both ends of a test subject optical transmission line, and the optical power of the upstream optical signal which is measured in a master station is incorporated into a downstream optical signal, thereby measuring optical transmission loss in the test subject optical transmission line in the slave station.

The structure of the optical communication system according to the third embodiment is the same as that of the second embodiment, except that a master station 71 is used instead of the master station 51 in FIG. 2 and slave stations 72 are used instead of the slave stations 52-1 to 52-k, and hence its explanation is omitted.

Figure 8:
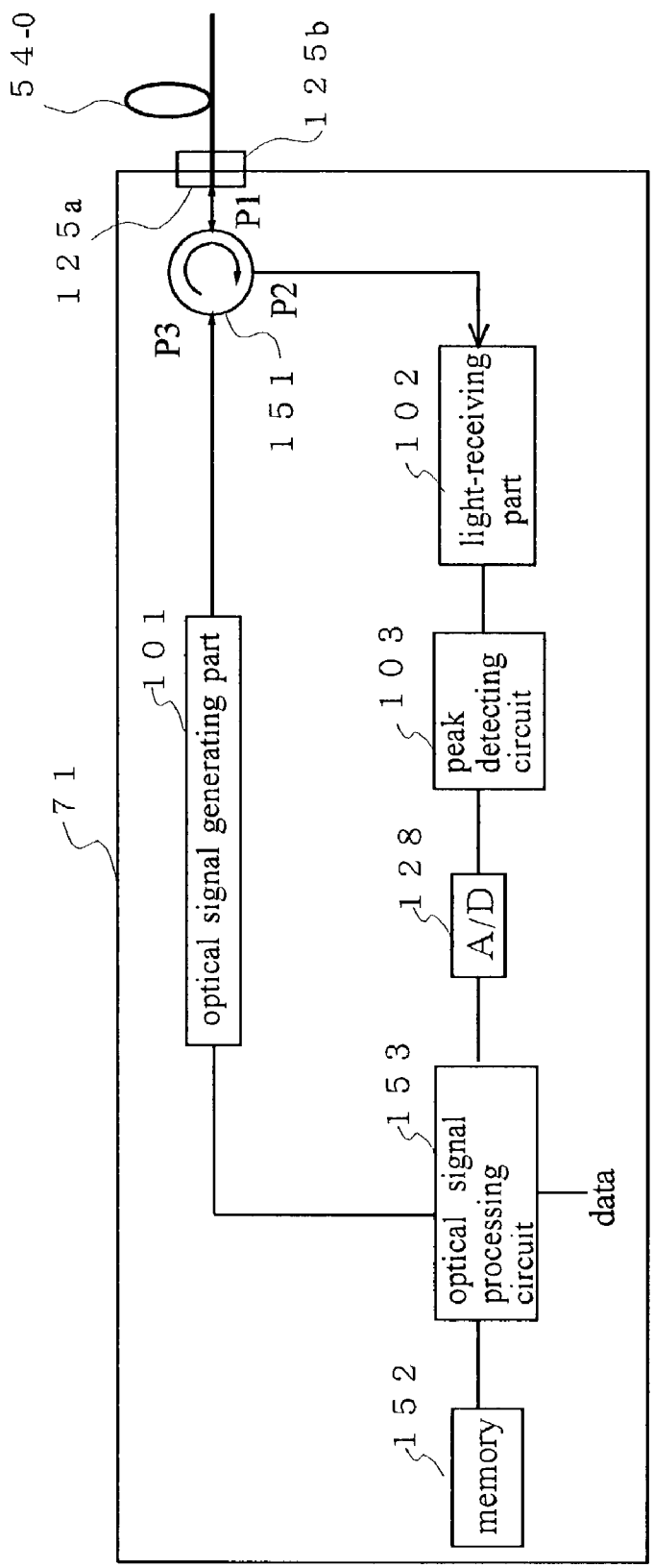
FIG. 8 is a view showing the structure of a master station of an optical communication system according to a third embodiment.

FIG. 8 is a view showing the structure of the master station of the optical communication system according to the third embodiment.

Figure 9:
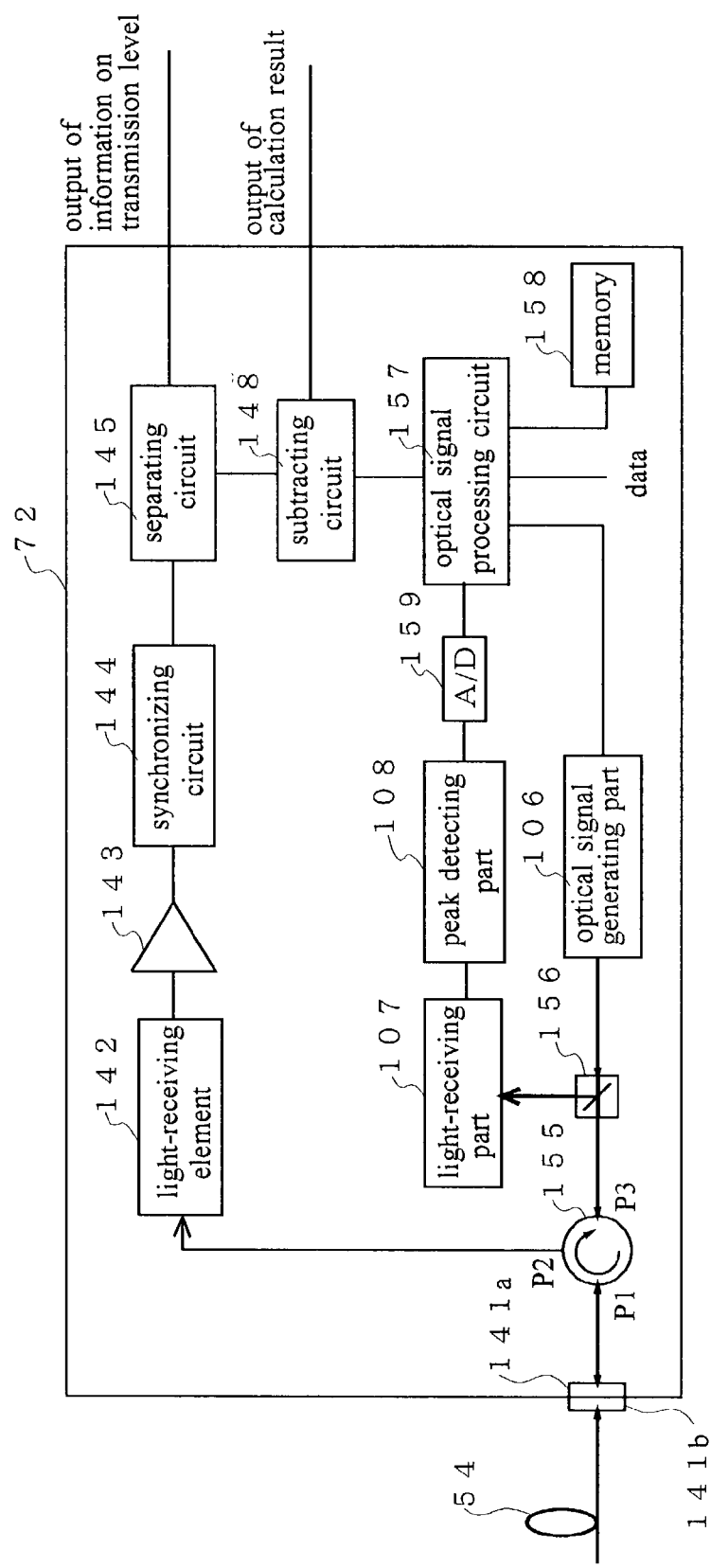
FIG. 9 is a view showing the structure of a slave station of the optical communication system according to the third embodiment.

FIG. 9 is a view showing the structure of the slave station of the optical communication system according to the third embodiment.

As shown in FIG. 8, the master station 71 is structured of an optical signal generating part 101, an optical circulator (hereinafter abbreviated to "Cir") 151, a connector 125a, a light-receiving part 102, a peak detecting part 103, an A/D 128, an optical signal processing circuit 153 and a memory 152.

An upstream optical signal which is made incident thereon via an optical transmission line 54-0 is made incident on the Cir 151 via a connector 125b. The Cir 151 outputs light which is made incident on a port P1 to a port P2, and outputs light which is made incident on a port P3 to the port P1.

Therefore, as to the upstream optical signal, a maximum value of a receiving level of the upstream optical signal is detected in the Cir 151, the light-receiving part 102 and the peak detecting part 103. The detection result is outputted to the optical signal processing circuit 153 via the A/D 128.

The optical signal processing circuit 153 obtains a receiving level of an additional slave station 72 from the maximum value of the receiving level, and stores the resultant in the memory 152. Various data such as a program for carrying out a later-described optical transmission loss measuring test, values needed during execution of the program, a current value for driving a light-emitting element in the optical signal generating part 101 is stored in the memory 152.

When generating the downstream optical signal, the optical signal processing circuit 153 accepts the receiving level of the additional slave station 72 from the memory 152, accepts data to be transmitted from the master station 71 to the slave station 72 from a not-shown circuit, allows the optical signal generating part 101 to generate the downstream optical signal in which the information about the receiving level is incorporated, and outputs it to the port P3 of the Cir 151. The downstream optical signal which is made incident thereon is outputted from the port P3 of the Cir 151 to the port P1, and is outputted to the optical transmission line 54 through the connector 125a.

Next, the structure of the slave station 72 will be explained.

As shown in FIG. 9, the slave station 72 is structured of a connector 141a, a light-receiving element 142, an amplifier 143, a synchronizing circuit 144, a separating circuit 145, a subtracting circuit 148, a Cir 155, a CPL 156, a light-receiving part 107, a peak detecting part 108, an A/D 159, an optical signal processing circuit 157, an optical signal generating part 106, and a memory 158.

The optical signal generating part 106 is the same as the above-described optical signal generating part 101 in the master station 51, and generates the upstream optical signal. The upstream optical signal is outputted to the optical transmission line 54 via the CPL 156, a port P3 of the Cir 155, a port P1 of the Cir 155 and the connector 141a. As to the upstream optical signal, a part thereof is branched in the CPL 156, and a maximum value of a transmission level is detected in the light-receiving part 107 and the peak detecting part 108. The detection result is outputted to the optical signal processing circuit 157 via the A/D 159, and is stored in the memory 158. Since the light-receiving part 107 and the peak detecting part 108 are the same as the above-described light-receiving part 102 and the peak detecting part 103, explanations thereof are omitted.

Meanwhile, the downstream optical signal which is made incident thereon from the optical transmission line 54 is inputted to the separating circuit 145 via the connector 141a, the port P1 of the Cir 155, a port P2 of the Cir 155, the light-receiving element 142, the amplifier 143 and the synchronizing circuit 144.

The separating circuit 145 extracts data and information on the receiving level of the master station 71 from the electrical signal inputted via the synchronizing circuit 144, at a synchronizing timing of the synchronizing circuit 144. Then, the separating circuit 145 outputs the data to an exterior circuit (not shown) which uses the data, and outputs the information on the receiving level of the master station 71 to the subtracting circuit 148.

The subtracting circuit 148 subtracts the output of the peak detecting part 108 from the output of the separating circuit 145, and outputs the calculation result.

Operation and Effect of Third Embodiment

In such an optical communication system of star network, operation and effect in the case where an additional slave station 72-k is installed will be explained.

Figure 10:
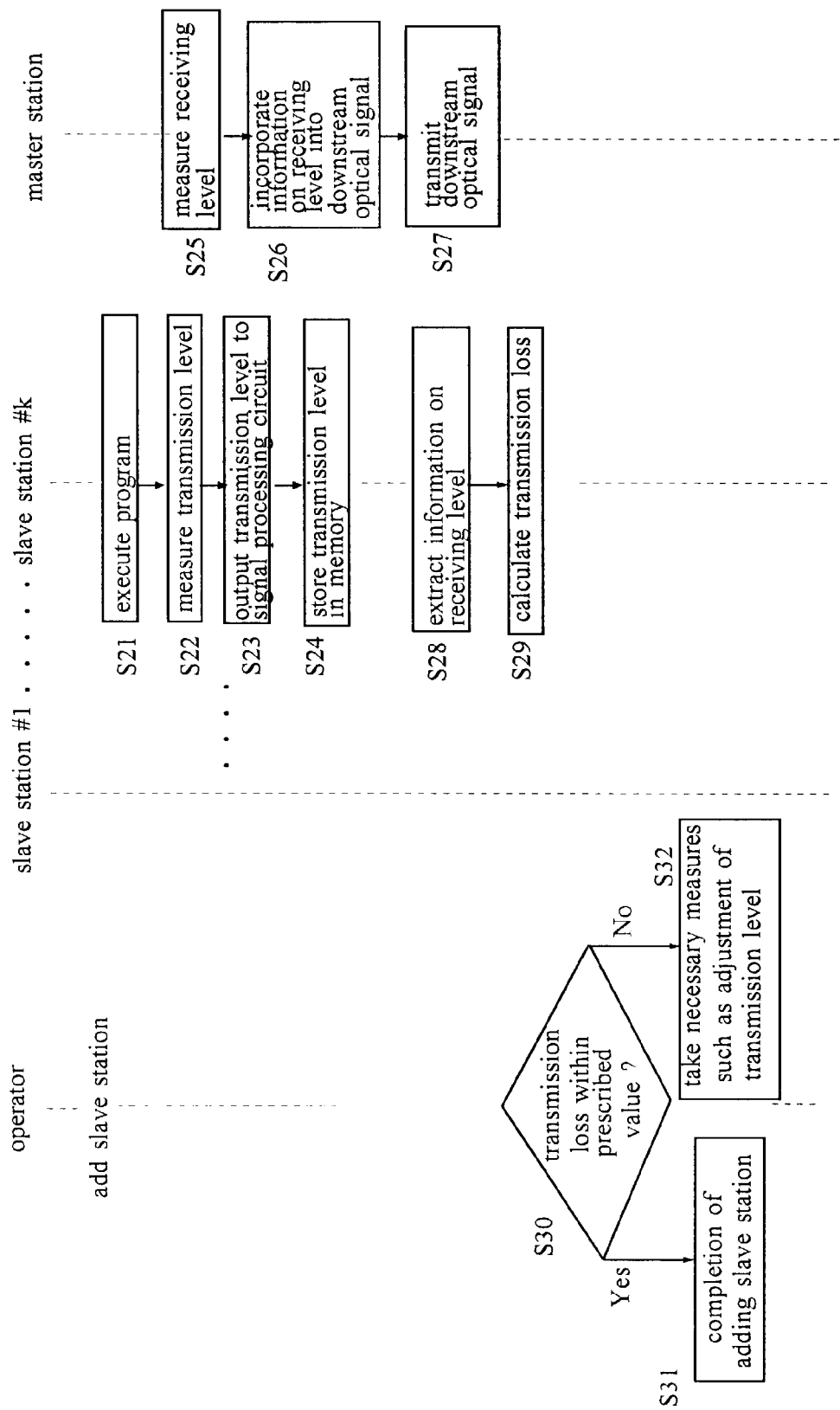
FIG. 10 is a flowchart showing a procedure of an optical transmission loss test according to the third embodiment.

FIG. 10 is a flowchart showing a procedure of the optical transmission loss measuring test according to the third embodiment.

In FIG. 10, the optical signal processing circuit 157 in the slave station 72-k reads and executes the optical transmission loss measuring test program which is stored in the memory 158, receiving an instruction from an operator or the like who installs the additional slave station 72-k (S21).

The optical signal processing circuit 157 allows the optical signal generating part 106 to output the upstream optical signal by a light-emission amount corresponding to the transmission level of the upstream optical signal, and allows the peak detecting part 108 to measure the transmission level of the upstream optical signal (S22).

The peak detecting part 108 outputs the measurement result to the optical signal processing circuit 157 (S23), and the optical signal processing circuit 157 stores this information about the transmission level of the upstream optical signal into the memory 158 (S24).

Meanwhile, the upstream optical signal is outputted to the optical transmission line 54-0. Then, this upstream optical signal is transmitted to the master station 71 via the CPL 61 of a star type in the optical repeater 53.

The master station 71 receives this upstream optical signal in the light-receiving part 102, and the peak detecting part 103 in the master station 71 detects the maximum value of the receiving level of the upstream optical signal (S25). Then, this detection result is outputted to the optical signal processing circuit 153.

In this case, since the master station 71 receives all the upstream optical signals from the respective slave stations 72, the optical signal processing circuit 153 compares the maximum values before and after the additional installation of the slave station 72-k, thereby obtaining the receiving level of the slave station 72-k. At this time, capacity of a slot which is allocated to the slave station 72-k is taken into consideration.

In the master station 71, the optical signal processing circuit 153 generates a downstream optical signal having the information about the receiving level incorporated therein, according to the information on the receiving of the slave station 72-k and, data to be transmitted to the respective slave stations 72, it there exists.

The generated downstream optical signal is transmitted to the slave station 72-k via the optical transmission line 54-0, the optical repeater 53, and the optical transmission line 54-k (S27).

In the slave station 72-k, the separating circuit 145 extracts the information of the receiving level of the master station 71 from the electrical signal based on the received downstream optical signal, and outputs it to the subtracting circuit 148 (S28).

Then, in the slave station 72-k, the subtracting circuit 148 subtracts the extracted receiving level of the master station 71 from the transmission level which is detected in the slave station 72-k, whereby the optical transmission loss in the optical transmission lines 54 to which the additional slave station 52-k is connected is measured. Namely, the optical transmission loss in the optical transmission line 54-0, the optical repeater 53 and the optical transmission line 54-k is measured (S29).

The measurement result is outputted to the exterior and, for example, displayed on a display device.

S30 to S32, which are steps to be performed by the operator according to his judgement, are the same as S10 to S12 in the second embodiment, and hence explanations thereof are omitted.

It should be noted that the transmission level of the upstream optical signal is measured by the light-receiving part 107, the peak detecting part 108 and the A/D 159 in the third embodiment, however, it is also suitable to measure the transmission level by connecting an optical power meter which measures light intensity to the connector 141 a of the slave station 72, and to store the measurement result in the memory 158. In such a case, the slave station 72 does not need to have the light-receiving part 107, the peak detecting part 108 and the A/D 159.

Next, another embodiment will be explained.

Structure of Fourth Embodiment

A slave station, an optical communication system and an optical transmission loss measuring test method according to the present invention are applied to a fourth embodiment.

As a summary of the fourth embodiment, optical power of an upstream optical signal is measured at both ends of a test subject optical transmission line, the optical power of the upstream optical signal which is measured in an optical repeater is transmitted to a master station, and the received information about the optical power of the upstream optical signal is incorporated into a downstream optical signal in the master station, thereby measuring optical transmission loss in the test subject optical transmission line in the slave station.

Figure 11:
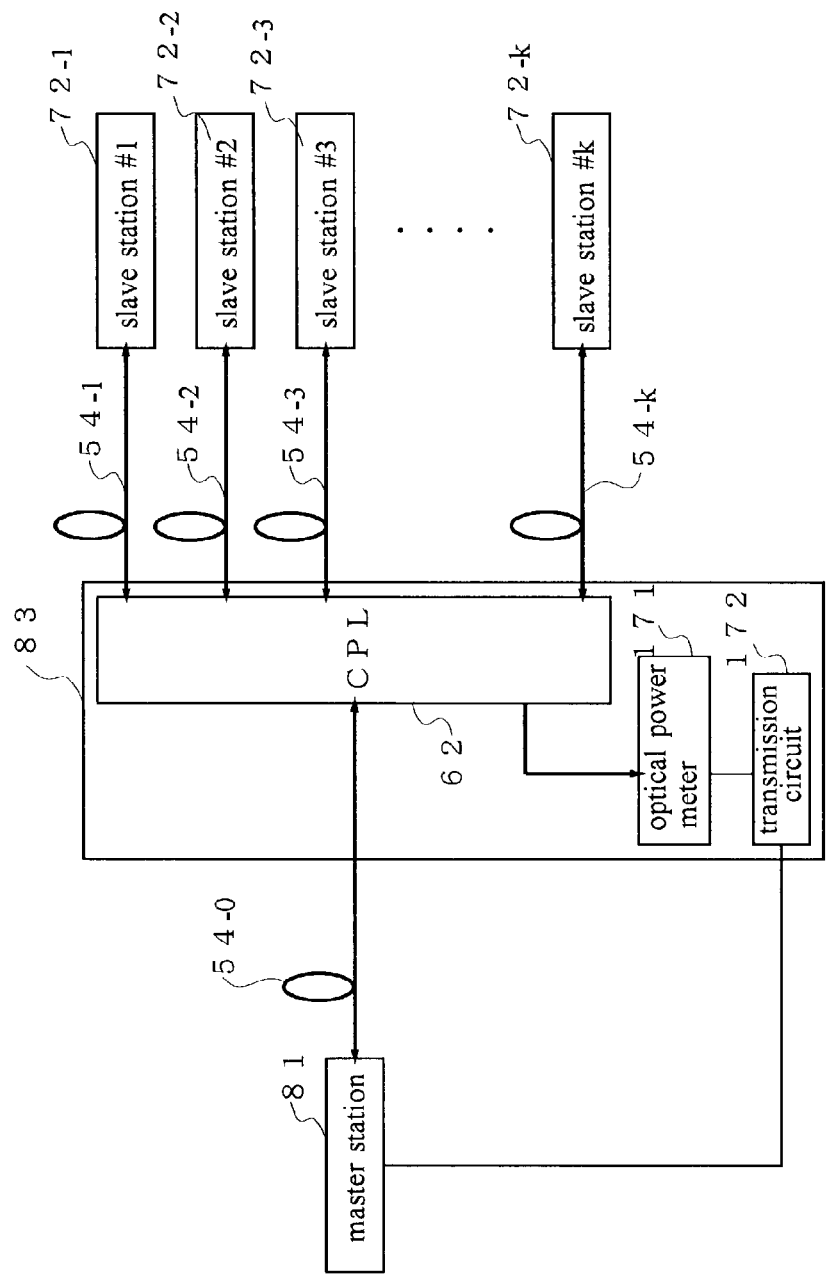
FIG. 11 is a view showing the structure of an optical communication system according to a fourth embodiment.

FIG. 11 is a view showing the structure of the optical communication system according to the fourth embodiment.

Figure 12:
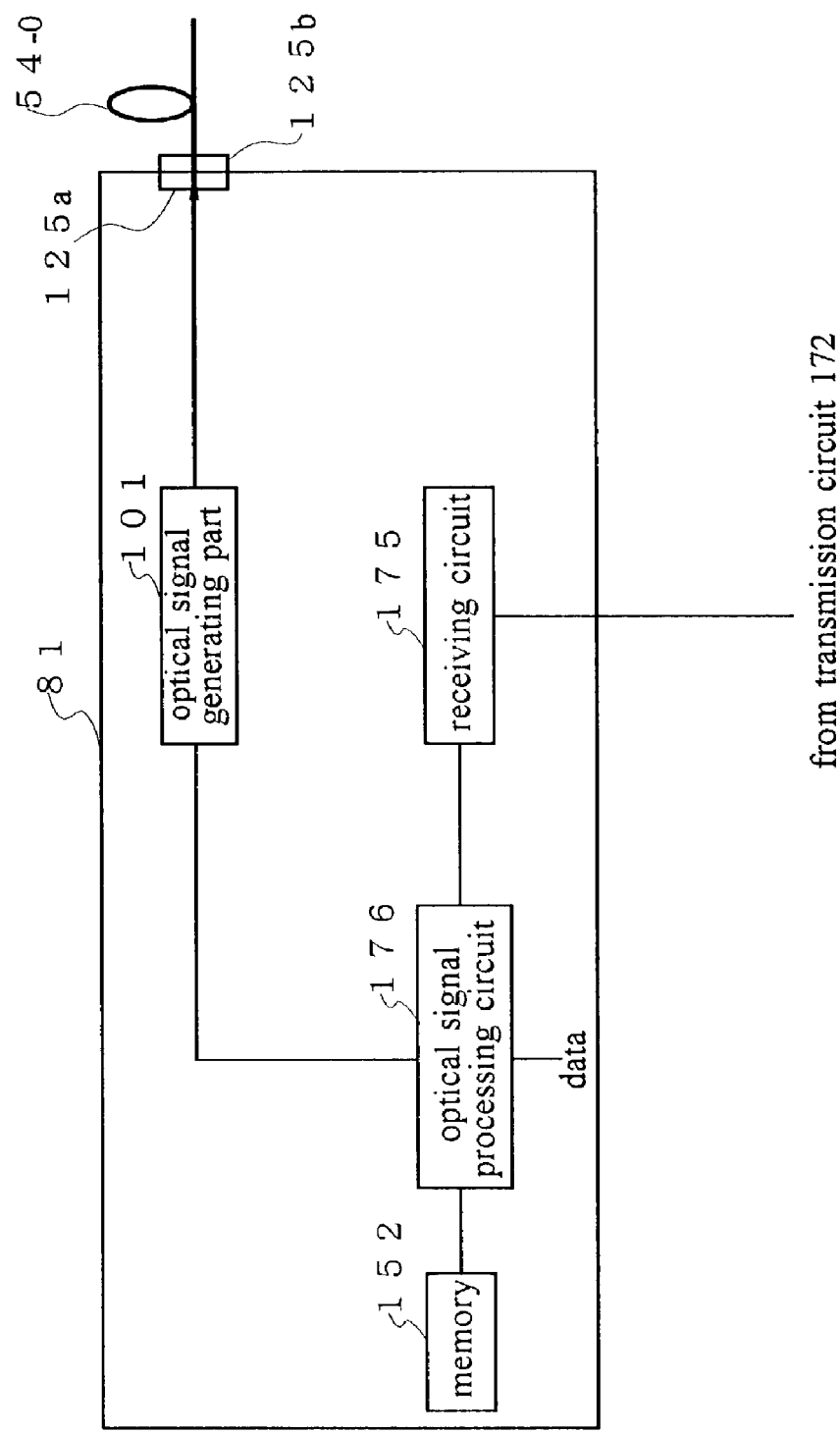
FIG. 12 is a view showing the structure of a master station of the optical communication system according to the fourth embodiment.

FIG. 12 is a view showing the structure of the master station of the optical communication system according to the fourth embodiment.

As shown in FIG. 11, the optical communication system is structured of a master station 81, a plurality of slave stations 72-1 to 72-k, an optical repeater 83 and optical transmission lines 54 which are connected in a star network.

A downstream optical signal which is generated in the master station 81 is made incident on the optical repeater 83 via an optical transmission line 54-0. The optical repeater 83 is structured of a CPL 62 of a star type, an optical power meter 171 and a transmission circuit 172, and branches this downstream optical signal into at least a number of downstream optical signals corresponding to the number of the slave stations 72-1 to 72-k, in the CPL 62. The branched downstream optical signals are made incident on slave stations 72-1 to 72-k via optical transmission lines 54-1 to 54-k, respectively.

Meanwhile, among upstream optical signals transmitted from the slave stations 72-1 to 72-k to the master station 81, for example, an upstream optical signal from the slave station 72-k is made incident on the CPL 62 in the optical repeater 83 via the optical transmission line 54-k to which the slave station 72-k is connected.

This upstream optical signal is branched into two in the CPL 62. One of the branched upstream optical signals is transmitted to the master station 81 via the optical transmission line 54-0. The other of the branched upstream optical signals is made incident on the optical power meter 171, whose optical power is measured. The measurement result is outputted to the transmission circuit 172, converted into an optical signal which is suitable for transmission, and transmitted to a receiving circuit 175 in the master station 81.

Namely, the CPL 62 branches the downstream optical signal into at least a number of downstream optical signals corresponding to the number of the slave stations 72-1 to 72-k, and the upstream optical signal into at least two for the master station 81 and the optical power meter 171.

Next, the structure of the master station 81 will be explained.

As shown in FIG. 12, the master station 81 is structured of an optical signal generating part 101, a connector 125a, the receiving circuit 175, an optical signal processing circuit 176 and a memory 152. It should be noted that receiving processing for the upstream optical signals transmitted from the slave stations 72 is omitted.

The receiving circuit 175 receives and processes an optical signal which is transmitted from the transmission circuit 172 in the optical repeater 83, and outputs a receiving level of the upstream optical signal in the optical repeater 83 to the optical signal processing circuit 176.

The optical signal processing circuit 176 obtains a receiving level of an additional slave station 72 from the output of the receiving circuit 175, and stores the resultant in the memory 152.

Namely, the receiving level of the upstream optical signal is measured by the light-receiving part 102 and the peak detecting part 103 in the third embodiment, however, in the fourth embodiment it is obtained from the receiving circuit 175.

Meanwhile, when generating the downstream optical signal, the optical signal processing circuit 176 accepts the receiving level of the additional slave station 72 from the memory 152, accepts data to be transmitted from the master station 71 to the slave station 72 from a not-shown circuit, allows the optical signal generating part 101 to generate the downstream optical signal having the information about the receiving level incorporated therein, and outputs it to the optical transmission line 54 via the connector 125a.

Operation and Effect of Fourth Embodiment

In such an optical communication system of star network, operation and effect in the case where an additional slave station 72-k is installed will be explained.

FIG. 13 is a flowchart showing a procedure of the optical transmission loss test according to the fourth embodiment.

In FIG. 13, since the optical signal processing circuit 157's processings for execution of the optical transmission loss measuring test program and storage of the transmission level of the downstream optical signal in the slave station 72-k, are the same as those of the third embodiment, explanations thereof are omitted. Namely, S41 to S44 are the same as S21 to S24 in the third embodiment.

Meanwhile, the upstream optical signal is outputted to the optical transmission line 54-k. Then, this upstream optical signal is branched into two in the CPL 62 of a star type in the optical repeater 83. One of the branched upstream optical signals is transmitted to the master station 81 via the optical transmission line 54-0 and the other of the branched upstream optical signals is outputted to the optical power meter 171.

The optical power meter 171 in the optical repeater 83 receives the upstream optical signal, and measures the optical power of the upstream optical signal (S45). The measurement result is outputted to the transmission circuit 172, and the transmission circuit 172 transmits the measurement result to the receiving circuit 175 in the master station 81 (S46).

In the master station 81, the optical signal processing circuit 176 obtains information of the receiving level of the slave station 72-$k$ in the optical repeater 83 via the receiving circuit 175.

In this case, since the optical repeater 83 receives all the upstream optical signals from the respective slave stations 72-1 to 72-$k$, the optical signal processing circuit 176 compares the outputs of the receiving circuit 175 before and after the additional installation of the slave station 72-$k$, thereby obtaining the receiving level of the slave station 72-$k$. Incidentally, consideration will be given to capacity of a slot which is allocated to the slave station 72-$k$.

In the master station 81, the optical signal processing circuit 176 generates the downstream optical signal having the information about the receiving level of the slave station 72-$k$ incorporated therein based on the information and data to be transmitted to the respective slave stations 72, if there exists. (S47).

The generated downstream optical signal is transmitted to the slave station 72-$k$ via the optical transmission line 54-0, the optical repeater 83, and the optical transmission line 54-$k$ (S48).

The extraction of the information of the receiving level of the optical repeater 83, the measurement of the optical transmission loss in the test subject optical transmission line 54, the processing performed based on an operator's judgment in the slave station 72-$k$, are the same as those of the third embodiment, and hence explanations thereof are omitted. Namely, S49 to S53 are the same as S28 to S32 in the third embodiment.

Thus, the optical transmission loss in the optical transmission line 54-$k$ is measured.

It should be noted that the transmission level of the upstream optical signal is measured by the optical power meter 171 in the fourth embodiment, however, it may be measured by the light-receiving part 107, the peak detecting part 108 and the A/D 159 as explained in the second and the third embodiments.

According to the second to the fourth embodiments, a structural example of the peak detecting parts 103 and 108 is shown in FIG. 5, but it is not limited thereto. For example, the peak detecting part may have a circuit structure in which it accepts output of the light-receiving part 102 at certain intervals; the output measured at an predetermined interval is stored in a storing circuit, the output value is compared with a value of the next output; and when the value is larger than the stored value, the storage content of the storing circuit is updated with the second next output. In this structure, a maximum value will be of the storage content.

Moreover, according to the second to the fourth embodiments, the optical signal generating parts 101 and 106 directly modulate light, however, it is not limited thereto. For example, a Mach-Zehnder interferometer type optical modulator may externally modulate a laser light which is emitted from a laser diode and the like.

Furthermore, according to the second to the fourth embodiments, the operator determines whether the optical transmission loss in the test subject optical transmission line is within the range of the preset values and takes measures according to the result (S10 to S12), but a processing circuit for performing the operator's doing may be provided in the slave station. This processing circuit comprises a memory for storing information indicating the range of the preset values and a program to making the judgment, and a microprocessor for executing the program. It is suitable that the microprocessor compares the output of the subtracting circuit 148 and the range of the preset values stored in the memory, and adjusts the transmission level of the slave station by an optical amplifier and the like based on the result.

The invention is not limited to the above embodiments and various modifications may be made without departing from the spirit and scope of the invention. Any improvement may be made in part or all of the components.

What is claimed is:

1. A method for measuring a transmission loss in an optical communication system in which a master station is connected to an optical repeater and a plurality of slave stations are connected in a star network to the optical repeater so that the master station transmits optical signals to the plurality of slave stations through the optical repeater, and so that the plurality of slave stations transmit optical signals to the master station through the optical repeater, the method comprising:

measuring power of an optical signal transmitted from a respective slave station to the master station, or from the master station to a respective slave station, the power being measured at the optical repeater;

incorporating, at said master station, information indicating the measured power into a downstream optical signal to be transmitted to the respective slave station;

measuring power of said optical signal transmitted from the respective slave station to the master station, or from the master station to the respective slave station, at the respective slave station;

extracting said information from said downstream optical signal at the respective slave station; and obtaining a transmission loss between the optical repeater and the respective slave station, based on the extracted information and the power of said optical signal measured at the respective slave station.

2. The method according to claim 1, wherein:

said optical signal transmitted from the respective slave station to the master station, or from the master station to the respective slave station, is a downstream optical signal transmitted from the master station to the respective slave station.

3. The method according to claim 1, wherein:

said optical signal transmitted from the respective slave station to the master station, or from the master station to the respective slave station, is an upstream optical signal transmitted from the respective slave station to said master station.

4. A respective slave station for measuring transmission loss in an optical communication system in which a master station is connected to an optical repeater and a plurality of slave stations including the respective slave station are connected in a star network to the optical repeater so that the master station transmits optical signals to the plurality of slave stations through the optical repeater, and so that the plurality of slave stations transmit optical signals to the master station through the optical repeater, the respective slave station comprising:

a measuring unit measuring power of an optical signal transmitted from the respective slave station to the master station, or from the master station to the respective slave station, the power being measured at the respective slave station;

an information extracting unit extracting information indicating measured power of the optical signal transmitted from the respective slave station to the master station, or from the master station to the respective slave station, the measured power indicated by the extracted information having been measured at the optical repeater, and the information being extracted from a downstream optical signal transmitted to the respective slave station, and the information having been incorporated at the master station into the downstream optical signal; and a processing unit for obtaining a transmission loss between the optical repeater and the respective slave station, based on a difference between the power measured by said measuring unit and the power indicated by the information extracted by the said information extracting unit.

5. The slave station according to claim 4, wherein:

said optical signal transmitted from the respective slave station to the master station, or from the master station to the respective slave station, is a downstream optical signal transmitted from the master station to the respective slave station.

6. The slave station according to claim 4, wherein:

said optical signal transmitted from the respective slave station to the master station, or from the master station to the respective slave station, is an upstream optical signal transmitted from the respective slave station to the master station.

7. A master station for measuring a transmission loss in an optical communication system in which the master station is connected to an optical repeater and a plurality of slave stations are connected in a star network to the optical repeater so that the master station transmits optical signals to the plurality of slave stations through the optical repeater, and so that the plurality of slave stations transmit optical signals to the master station through the optical repeater, the master station comprising an incorporating unit for incorporating information indicating measured power of an optical signal transmitted from a respective slave station to the master station, or from the master station to a respective slave station, into a downstream optical signal to be transmitted to the respective slave station, the power of the optical signal being measured at the optical repeater, the incorporated information being extracted by the respective slave station to obtain a transmission loss between the optical repeater and the respective slave station.

8. An optical communication system in which a master station is connected to an optical repeater, and a plurality of slave stations are connected in a star network to the optical repeater by a plurality of optical transmission lines, respectively, so that the master station transmits optical signals to the plurality of slave stations through the optical repeater, and so that the plurality of slave stations transmit optical signals to the master station through the optical repeater, the system comprising:

a storing unit, provided in said master station, storing information indicating measured power of an optical signal transmitted from a respective slave station to the master station, or from the master station to a respective slave station, the power being measured at the optical repeater;

an incorporating unit, provided in said master station, incorporating the stored information into a downstream optical signal to be transmitted to the respective slave station;

a measuring unit, provided in the respective slave station, measuring power of the optical signal transmitted from the respective slave station to the master station, or from the master station to the respective slave station, at the respective slave station;

an information extracting unit, provided in the respective slave station, extracting the incorporated information from said downstream optical signal; and a processing unit, provided in the respective slave station, obtaining a transmission loss the respective optical transmission line connecting the respective slave station to the optical repeater, from a difference between the power measured by said measuring unit and the power indicated by the information extracted by said information extracting unit.

9. The optical communication system according to claim 8, wherein:

said optical signal transmitted from a respective slave station to the master station, or from the master station to a respective slave station, is a downstream optical signal transmitted from said master station to the respective slave station.

10. The optical communication system according to claim 8, wherein:

said optical signal transmitted from a respective slave station to the master station, or from the master station to a respective slave station, is an upstream optical signal transmitted from the respective slave station to said master station.

11. An optical communication system in which a master station is connected to an optical repeater, and a plurality of slave stations are connected in a star network to the optical repeater by a plurality of optical transmission lines, respectively, so that the master station transmits optical signals to the plurality of slave stations through the opticai repeater, and so that the plurality of slave stations transmit optical signals to the master station through the optical repeater, the system comprising:

a first measuring unit measuring power of an optical signal transmitted from a respective slave station to the master station, or from the master station to a respective slave station, the power being measured at the optical repeater;

a transferring unit transferring information indicating the measured power to the master station;

an incorporating unit, provided in said master station, incorporating the transferred information into a downstream optical signal to be transmitted to the respective slave station;

a second measuring unit, provided in the respective slave station, measuring power of the optical signal transmitted from a respective slave station to the master station, or from the master station to a respective slave station, at the respective slave station;

an information extracting unit, provided in the respective slave station, extracting the incorporated information from said downstream optical signal; and a processing unit, provided in the respective slave station, obtaining a transmission loss in the respective optical transmission line connecting the respective slave station to the optical repeater, the transmission loss being obtained from a difference between the power measured by said measuring unit and a power indicated by the information extracted by said information extracting unit.

12. The optical communication system according to claim 11, wherein:
said optical signal transmitted from a respective slave station to the master station, or from the master station to a respective slave station, is a downstream optical signal transmitted from said master station to the respective slave station.

13. The optical communication system according to claim 11, wherein:
said optical signal transmitted from a respective slave station to the master station, or from the master station to a respective slave station is an upstream optical signal transmitted from the respective slave station to said master station.

14. The optical communication system according to claim 11, wherein
said first measuring unit and said transferring unit are provided in said optical repeater.

15. An apparatus comprising:
a master station;
a plurality of slave stations;
an optical repeater connecting the master station to the plurality of slave stations in a star network so that, for each of the slave stations, a respective optical communication path exists from the master station, through the optical repeater, to the respective slave station; and
means for measuring power of an optical signal transmitted from the master station to a respective slave station, or from a respective slave station to the master station, the power being measured at the optical repeater, wherein
the master station comprises means for incorporating information indicating the measured power into an optical signal and for transmitting the optical signal with the incorporated information to the respective slave station through the respective optical communication path to the respective slave station, and
the respective slave station comprises
means for receiving the transmitted optical signal into which the information is incorporated,
means for extracting the information from the received optical signal, and
means for determining a transmission loss in the respective optical communication path to the respective slave station based on the extracted information and a measured power of the optical signal transmitted from the master station to a respective slave station, or from a respective slave station to the master station, as measured at the respective slave station, the transmission loss being a transmission loss in a portion of the respective optical communication path from the optical repeater to the respective slave station.

16. An apparatus as in claim 15, wherein the respective slave station is an added slave station so that the star network connects the master station to the respective slave station, and the other slave stations of the plurality of slave stations are previously connected to the master station by the star network.

17. An apparatus comprising:
a master station;
a plurality of slave stations;
an optical repeater connecting the master station to the plurality of slave stations in a star network so that, for each slave station of the plurality of slave stations, a respective optical communication path exists from the master station to the respective slave station, wherein
the master station incorporates information indicating a measured power of an optical signal transmitted from the master station to a respective slave station, or from a respective slave station to the master station, into an optical signal, and transmits the optical signal with the incorporated information to the respective slave station through the respective optical communication path to the respective slave station, the measured power being measured at the optical repeater, and
the respective slave station receives the transmitted optical signal, extracts the information from the received optical signal, and determines a transmission loss in the respective optical communication path based on the extracted information and a power measured at the respective slave station of the optical signal transmitted from the master station to the respective slave station, or from the respective slave station to the master station, the transmission loss being a transmission loss in a portion of the respective optical communication path from the optical repeater to the respective slave station.

18. An apparatus as in claim 17, wherein the respective slave station is an added slave station so that the star network connects the master station to the respective slave station, and the other slave stations of the plurality of slave stations are previously connected to the master station by the star network.

19. A method of determining a transmission loss in an optical communication system in which an optical repeater connects a master station to a plurality of slave stations in a star network so that, for a respective slave station of the plurality of slave stations, an optical communication path exists from the master station to the respective slave station, the method comprising:
measuring power of an optical signal transmitted from the master station to the respective slave station, or from the respective slave station to the master station, the power being measured at the optical repeater;
incorporating information indicating the measured power by the master station into an optical signal and transmitting the optical signal with the incorporated information to the respective slave station through the optical communication path to the respective slave station
receiving the transmitted optical signal by the respective slave station;
extracting the information from the received optical signal;
determining a transmission loss in the optical communication path to the respective slave station based on the extracted information and a power of the optical signal transmitted from the master station to the respective slave station, or from the respective slave station to the master station, the transmission loss being a transmission loss in a portion of the optical communication path from the optical repeater to the respective slave station.

20. A method as in claim 19, wherein the respective slave station is an added slave station so that the star network connects the master station to the respective slave station, and the other slave stations of the plurality of slave stations are previously connected to the master station by the star network.

21. An apparatus for determining a transmission loss in an optical communication system in which an optical repeater connects a master station to a plurality of slave stations in a star network so that, for a respective slave station of the plurality of slave stations, an optical communication path exists from the master station to the respective slave station, the apparatus comprising:

means for measuring power of an optical signal transmitted from the master station to the respective slave station, or from the respective slave station to the master station, the power being measured at the optical repeater;

means for incorporating information indicating the measured power by the master station into an optical signal and for transmitting the optical signal with the incorporated information to the respective slave station through the optical communication path to the respective slave station;

means for receiving the transmitted optical signal by the respective slave station;

means for extracting the information from the received optical signal; and means for determining a transmission loss in a portion of the optical communication path to the respective slave station from the optical repeater to the respective slave station, based on the extracted information and a power of the optical signal transmitted from the master station to the respective slave station, or from the respective slave station to the master station, measured at the respective slave station.

* * * * *

UNITED STATES PATENT AND TRADEMARK OFFICE
CERTIFICATE OF CORRECTION

PATENT NO. : 7,027,730 B2 Page 1 of 1
APPLICATION NO. : 10/289305
DATED : April 11, 2006
INVENTOR(S) : Nagayama et al.

It is certified that error appears in the above-identified patent and that said Letters Patent is hereby corrected as shown below:

Column 18, line 42, change "opticai" to --optical--

Column 20, line 50, after "station" insert --;--

Signed and Sealed this

First Day of August, 2006

JON W. DUDAS
*Director of the United States Patent and Trademark Office*